United States Patent [19]

Hart

[11] Patent Number: 5,238,122
[45] Date of Patent: Aug. 24, 1993

[54] SORTING METHOD AND APPARATUS

[75] Inventor: Norbert Hart, Dettingen, Fed. Rep. of Germany

[73] Assignee: RSL Logistik GmbH & Co., Fed. Rep. of Germany

[21] Appl. No.: 892,311

[22] Filed: Jun. 2, 1992

[30] Foreign Application Priority Data

Jun. 3, 1991 [DE] Fed. Rep. of Germany ....... 4118164

[51] Int. Cl.⁵ .............................................. B07C 5/00
[52] U.S. Cl. ................................. 209/555; 209/936; 209/937
[58] Field of Search ............... 209/937, 3.1, 3.3, 583, 209/569, 552, 555, 556, 557, 558, 936, 942; 198/465.4

[56] References Cited

U.S. PATENT DOCUMENTS

| 4,239,435 | 12/1980 | Weiss et al. ............ 198/465.4 |
| 4,388,994 | 6/1983 | Suda et al. . |
| 5,058,750 | 10/1991 | Graese .................. 198/465.4 |
| 5,072,822 | 12/1991 | Smith ................... 198/465.4 |

FOREIGN PATENT DOCUMENTS 1556616 7/1970 Fed. Rep. of Germany .
2079708 1/1982 United Kingdom .

Primary Examiner—H. Grant Skaggs
Attorney, Agent, or Firm—Finnegan, Henderson, Farabow, Garrett & Dunner

[57] ABSTRACT

A method and an apparatus for sorting garments of different types and sizes. The garments are sorted according to different selection criteria, such as type and size, and put together in delivery groups respectively assigned to one buyer. To make such a method and such an apparatus more simple, also for a great number of buyers, the garments should be sorted in at least two steps, sorting being performed in the first step according to a first selection criterion and pre-groups being formed, and sorting being performed in the second step according to a second selection criterion and second pre-groups being formed, with intermediate groups being formed within the second pre-group and containing the garments of a specific size and a specific type respectively assigned to a specific buyer. All intermediate groups assigned to a specific buyer are subsequently combined to obtain the delivery group.

6 Claims, 1 Drawing Sheet

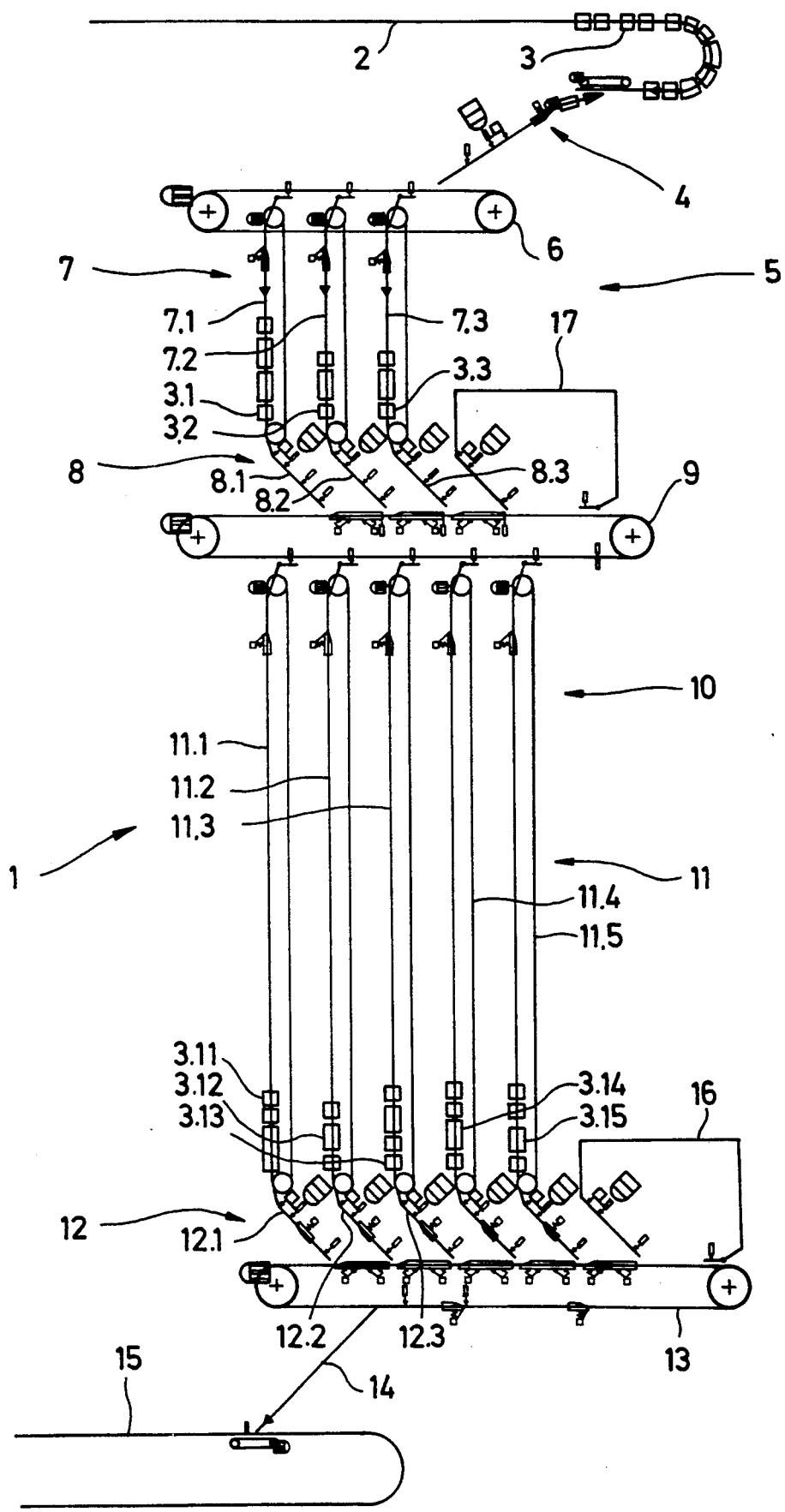

SORTING METHOD AND APPARATUS

BACKGROUND OF THE INVENTION

This invention relates to a method and apparatus for sorting garments of different types and sizes.

A method and an apparatus of this type are known from DE-OS 39 02 712. In the known method, incoming garments are sorted according to type and size and are immediately passed to the conveying means assigned to each customer. All conveying means assigned to different customers circulate within a conveying circle and are loaded one after the other, all garments of one type and one size being first distributed over all buyers before the next type and size of the garments are handled. After a complete delivery group has been put together on one of the conveying means, said group is discharged. The known method, however, is only suited for a relatively limited number of buyers or delivery groups whose number can not exceed the space available within the conveying circle.

It is therefore the object of the present invention to provide a sorting method and apparatus with the help of which a multitude of delivery groups can be put together and wherein the space needed is relatively small.

SUMMARY OF THE INVENTION

This object is attained by providing a method of sorting garments of different types and sizes, the garments being sorted according to different selection criteria, such as type and size, and being put together in delivery groups respectively assigned to one buyer, characterized in that the garments are sorted in at least two steps, sorting being performed in the first step according to a first selection criterion and pre-groups being formed, that sorting is performed in the second step according to a second selection criterion and second pre-groups are formed, with intermediate groups being formed within said second pre-groups, said intermediate groups containing the garments of a specific size and a specific type respectively assigned to a specific buyer, and that all intermediate groups assigned to a specific buyer are subsequently combined to obtain the delivery group.

The object is also attained by providing an apparatus for carrying out the method characterized in that at least two sorting steps (5, 10) are provided, each sorting step (5, 10) including a plurality of conveyor sections (7.1–7.3, 11.1–11.5) and each conveyor section (7.1–7.3) of said first sorting step (5) having to be connected to each conveyor section (11.1–11.5) of each second sorting step (10), and that a collection conveyor (13) is provided after the last sorting step (10) in the direction of conveyance.

A conveying circle is not necessary due to the inventive sorting in two steps and due to the fact that a common conveyor section is dispensed with. The conveyor sections must be arranged such that sorting may be performed according to the selection criteria with the least variety, e.g. size or type, while the selection criteria of the greatest variety, e.g. the number of customers, need not be represented by an extra conveyor section or a specific place along a common conveying circle.

BRIEF DESCRIPTION OF THE DRAWINGS

An embodiment of the invention will be explained in more detail with reference to the drawing which is a diagrammatic top view of the apparatus of the invention.

DETAILED DESCRIPTION OF THE INVENTION

The apparatus 1 of the invention includes a delivery path 2 for supplying garments hung e.g. on hangers, with separation hangers being possibly provided within the delivery flow for monitoring the sorting operations. The delivery path 2 which is formed as a screw or a path of conveying means terminates in a first sorting station 4 of a first sorting step 5. The first sorting step 4 includes a distribution conveyor 6 and a plurality of conveyor sections 7.1, 7.2 and 7.3 whose number corresponds to the variety of the first selection criterion. For instance, if sorting is performed in the first sorting step according to size, the number of conveyor sections 7 corresponds to the number of the sizes to be distributed.

Each of the conveyor sections 7.1, 7.2, 7.3 terminates via a second sorting station 8.1, 8.2, 8.3 of its own in a distribution conveyor 9 of a second sorting step 10. The distribution conveyor 9 is respectively connected to a plurality of second conveyor sections 11 1, 11.2, 11.3, 11.4, 11.5. The number of the second conveyor sections 11 corresponds to the variety of the garments to be sorted according to a second selection criterion. In the present embodiment, there are five second conveyor sections 11 that correspond to five different types of garments, e.g., five different colors or five different cuts, or the like.

Each of the second conveyor sections 11 is connected via its own sorting station 12.1, 12.2, 12.3, 12.4 and 12.5 to a collection conveyor 13 which, in turn, has a gate 14 through which the garments can be discharged onto a transportation conveyor 15. The collection conveyor 13 and the distribution conveyor 9 are each connected to an input and output of a secondary loop 16 and 17, respectively, to which misdirected garments and/or separation hangers, or the like, are transferred and can be removed from the normal flow of goods.

In the sorting process, garments 3 are supplied, either roughly sorted or unarranged, along the delivery path 2 to the first sorting station 4. During automatic operation, the respective code on the garment or on the separation hanger is read, and the garments are transported in pre-groups 3.1, 3.2, 3.3 to the first conveyor section. Hence, each pre-group 3.1, 3 2, 3.3 includes garments of one size, but of different types. If the garments arrive in an already roughly sorted manner, they may additionally be sorted on the first conveyor sections 7 into intermediate groups that are represented in the drawing by self-contained rectangles. Hence, in the illustrated embodiment the conveyor section 7.1 includes a pre-group 3.1 of garments of one size, already roughly sorted into four intermediate groups of different types. Hence, each intermediate group includes garments of one size and of one type. By analogy, the conveyor sections 7.2 and 7.3 respectively contain different sizes in three intermediate groups of different types. Pre-groups 3.1 to 3.3 of conveyor sections 7.1 to 7.3 are subsequently discharged and passed via the sorting station 8.1 to the second distribution conveyor 9 from where the garments are passed to the second conveyor sections 11. The corresponding junctions of the second conveyor sections 11 are arranged such that a second pre-group 3.11, 3.12, 3.13, 3.14, 3.15 is respectively collected on the second conveyor sections 11. This second pre-group includes garments of the same type. Hence, each of the second conveyor sections 11.1 to 11.5 respectively carries garments of th same type, but of different size. The first pre-groups 3.1 to 3.3 are handled such that all garments assigned to the same first buyer are first distributed. Intermediate groups, again represented by rectangles, are here also formed within the second pre-group. These intermediate groups contain those garments of the type collected on this conveyor section and of the already roughly sorted size that are respectively assigned to the same buyer. Since the buyers are dealt with one after the other, those intermediate groups that are assigned to the first buyer are positioned at the first place on all conveyor sections 11.1-11.5. Those intermediate groups that are assigned to the second buyer are positioned at the second place, etc. Hence, for a multitude of buyers, the conveyor sections must just have a corresponding length. Subsequently, the delivery groups assigned to each individual buyer are put together in the sorting station 12 and discharged via gate 14 or loaded onto conveying means.

Selection criteria can be changed in case of need in a modification of the above-described embodiment. Instead of the above-described automatic operation, the invention may also be employed in semi-automatic apparatus or apparatus to be operated manually. The intermediate groups within the first pre-group can also be dispensed with if there is an adequate coding. If there is a great number of selection criteria, the number of sorting steps may also be increased. Moreover, several pre-groups may be accommodated on each conveyor section if the garments and pre-groups are marked accordingly.

I claim:

1. A method for sorting garments of different types and sizes in at least two sorting steps to form delivery groups, each of said delivery groups containing garments arranged in a pre-determined sequence in accordance with different selection criteria, said method comprising the steps of delivery essentially unsorted garments to a first sorting station, identifying each of said garments in said first sorting station according to specific selection criteria, transferring said identified garments to a first distribution conveyor for sorting said garments in a first sorting step according to a first selection criteria onto a plurality of first conveyor sections to form at least one pre-group on each first conveyor section, each of said first pre-groups comprising a plurality of first intermediate groups of the garments of the pre-group grouped according to a second selection criteria, transferring said pre-groups from said first conveyor sections to at least one other distribution conveyor for sorting said garments in a last sorting step according to a third selection criteria onto a plurality of last conveyor sections to form at least one last pre-group on each last conveyor section, each of said last pre-groups comprising a plurality of last intermediate groups of the garments of the last pre-group grouped according to said delivery groups, and then assembling said last intermediate groups of said last pre-groups of said last sorting step to form said delivery groups.

2. The method of claim 1, wherein the first selection criteria of the first sorting step sorts the garments into said pre-groups according to size.

3. The method of claim 2 wherein the second selection criteria of the first sorting step sorts the garments into intermediate groups of said pre-groups according to type.

4. An apparatus for sorting garments of different types and sizes in at least two sorting steps to form delivery groups, each of said delivery groups containing the garments arranged in a pre-determined sequence in accordance with different selection criteria, said apparatus comprising delivery means for delivering essentially unsorted garments to a first sorting station, means for identifying each of said garments at said first sorting station according to a specific selection criteria, said first sorting station comprising a distribution conveyor for receiving the garments from the delivery means and for sorting said garments according to a first selection criteria onto a plurality of first conveyor sections to form at least one pre-group on each first conveyor section, each of said pre-groups comprising said garments grouped into a plurality of first intermediate groups grouped according to a second selection criteria, at least one other sorting station comprising a last distribution conveyor for receiving said pre-groups from said first conveyor sections and for sorting said garments in a last sorting step according to a third selection criteria onto a plurality of last conveyor sections to form at least one last pre-group on each last conveyor section, each of said last pre-groups comprising said garments grouped into a plurality of last intermediate groups according to said delivery groups and a collection conveyor for assembling said last intermediate groups of said last conveyor sections of said last sorting step to form said delivery groups.

5. The apparatus of claim 4, wherein the number of conveyor sections in said first sorting station corresponds to the number of the first pre-groups to be formed according to said first selection criteria.

6. The apparatus of claim 5, wherein the number of conveyor sections in said last sorting step corresponds to the number of last pre-groups to be formed according to said third selections criteria.

* * * * *